United States Patent
Jarsaeter et al.

(10) Patent No.: US 11,505,130 B1
(45) Date of Patent: Nov. 22, 2022

(54) COMPONENT TRAY ASSEMBLY FOR VEHICLES

(71) Applicant: Zoox, Inc., Foster City, CA (US)

(72) Inventors: Mikael Jarsaeter, Burlingame, CA (US); Markus Jost, San Mateo, CA (US); Andrew Frank Raczkowski, San Jose, CA (US); Goutham Shanmuga Sundaram, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 307 days.

(21) Appl. No.: 16/861,450

(22) Filed: Apr. 29, 2020

(51) Int. Cl.
*B60R 7/04* (2006.01)
*B62D 25/08* (2006.01)
*B60R 11/02* (2006.01)

(52) U.S. Cl.
CPC ............ *B60R 7/04* (2013.01); *B60R 11/0223* (2013.01); *B62D 25/08* (2013.01)

(58) Field of Classification Search
CPC ........ B60R 7/04; B60R 11/0223; B62D 25/08
USPC .......... 296/37.16, 187.05, 187.11, 1.04, 1.08
See application file for complete search history.

(56) References Cited

U.S. PATENT DOCUMENTS

| | | | | |
|---|---|---|---|---|
| 3,104,041 A | * | 9/1963 | Craig ....................... | B60R 7/10 224/927 |
| 6,007,146 A | * | 12/1999 | Reuter ..................... | B60J 7/106 296/210 |
| 6,010,181 A | * | 1/2000 | Robbins ................ | B60G 15/068 296/203.04 |
| 6,808,228 B1 | * | 10/2004 | Campbell ............ | B62D 25/087 296/24.44 |
| 2013/0037338 A1 | * | 2/2013 | Harunari .................. | B60K 1/04 180/68.5 |
| 2019/0233013 A1 | * | 8/2019 | Tai ....................... | B62D 25/2036 |
| 2019/0248061 A1 | * | 8/2019 | Funato .................... | B29C 49/20 |
| 2019/0256013 A1 | * | 8/2019 | Ishii ....................... | B62D 25/14 |
| 2021/0323611 A1 | * | 10/2021 | Nagashima ........ | B62D 25/2018 |

FOREIGN PATENT DOCUMENTS

GB            2379419 A     *   3/2003    ............. B60R 19/00

* cited by examiner

*Primary Examiner* — D Glenn Dayoan
*Assistant Examiner* — E Turner Hicks
(74) *Attorney, Agent, or Firm* — Lee & Hayes, P.C.

(57) ABSTRACT

A component tray assembly for a vehicle. For example, the component tray assembly may be installed between a body of the vehicle and a seat bulkhead of the vehicle. The component tray assembly may include at least a component shelf, a cover disposed over the component shelf, and one or more components. In some examples, the component shelf includes three openings and the one or more components include three speakers respectively disposed within the openings. The component shelf may further include notches located proximate to the side of the component shelf where the component shelf attaches to the seat bulkhead. The positions and shapes of the openings and the notches may create a weakened region of the component shelf that is configured to deform the component tray assembly during a collision. By deforming, the component tray assembly is configured to minimize the amount of force that is imparted to the seat.

20 Claims, 14 Drawing Sheets

COMPONENT TRAY ASSEMBLY FOR VEHICLES

BACKGROUND

Vehicles may include surfaces to provide aesthetic cover to automotive components and/or house additional components or subcomponents of the vehicle. Such surfaces may include, for example, surfaces for retaining speakers that output sound in order to provide entertainment, informative content, and/or a means to communicate with passengers located within the vehicle. Ordinarily, the speakers located near the rear of a vehicle are installed within the vehicle's body or frame. This is because the strength of the vehicle's body or frame can provide support for the weight of the speakers and protection during a collision, such as a rear end collision, by not allowing the speakers to detach during the collision and impact the passengers within the vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1A:
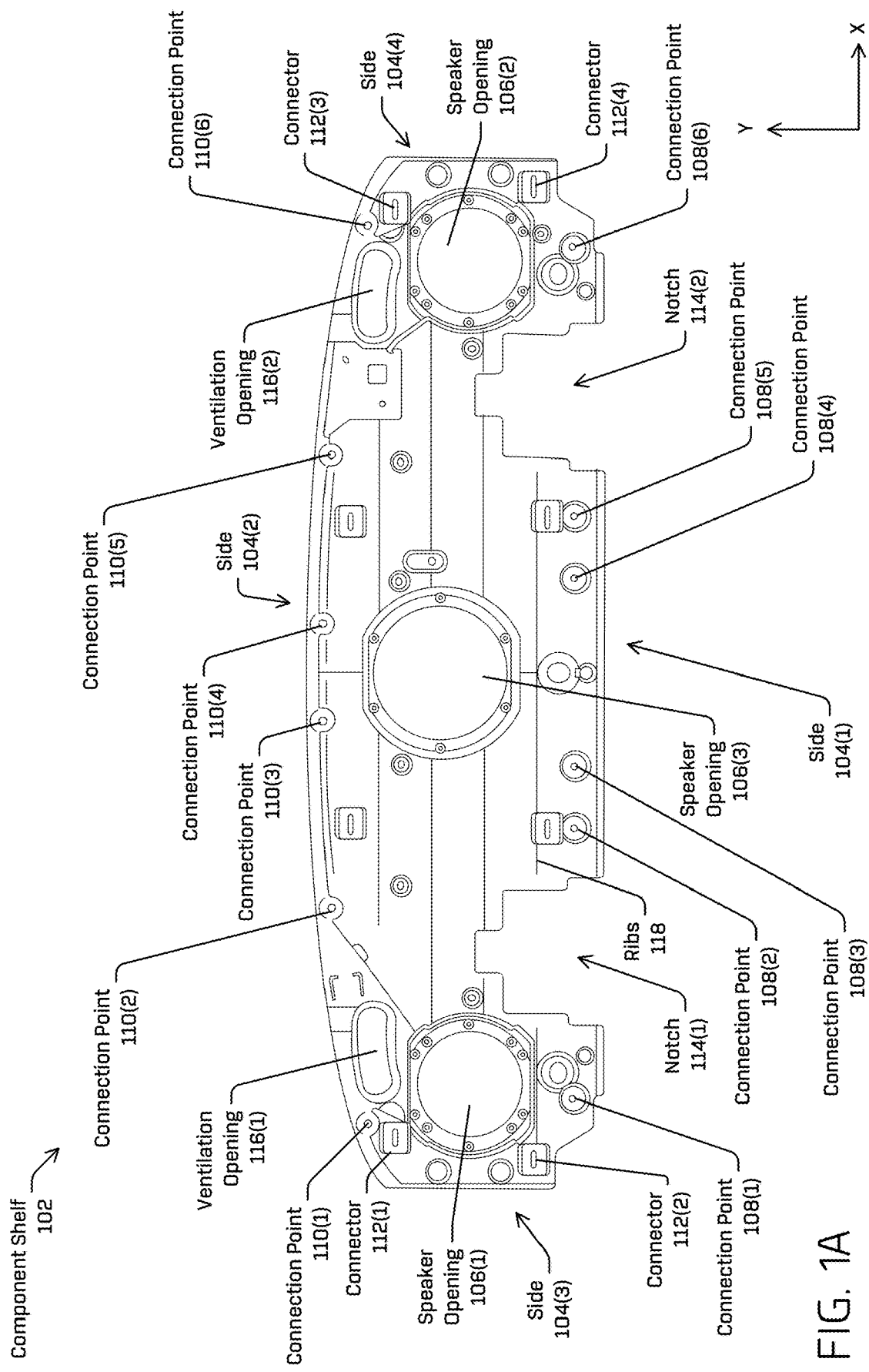
FIG. 1A illustrates a top view of an example component shelf, in accordance with examples of the disclosure.

As discussed above, vehicles may include surfaces to provide aesthetic cover to automotive components and/or house additional components or subcomponents of the vehicle. Such surfaces may include speakers that output sound in order to provide entertainment, informative content, and/or a means to communicate with passengers located within the vehicle. Ordinarily, the speakers located near the rear of a vehicle are installed within the vehicle's body or frame. This is because the strength of the vehicle's body or frame can provide protection during a collision, such as by not allowing the speakers to detach during the collision and impact the passengers within the vehicle. However, in many circumstances, it may be beneficial to install the rear speakers outside of the body or frame of the vehicle. This may be because of, for example, safety considerations, sound quality, speaker accessibility, and/or vehicle design. If the rear speakers are installed outside of the vehicle's body or frame, it may be beneficial to secure the speakers in a way that the speakers are both supported to avoid deflection and vibration during normal use and do not provide a risk to the passengers during a collision.

As such, the present application is directed to a component tray assembly that may be installed within a vehicle (e.g., an autonomous vehicle), such as within the rear of the vehicle, where the component tray assembly is configured to deform in a manner such that the component tray assembly does not materially transmit forces on the passengers during a collision. For instance, the component tray assembly may be separate from a body or frame of the vehicle and may include one or more openings that are configured to secure the component(s), such as speaker(s), within the component tray assembly. The component tray assembly may also include a weakened region that is configured to cause the component tray assembly to deform in a controlled manner during a collision. In some examples, the component tray assembly deforms by bending and/or fracturing at the weakened region of the component tray assembly. By deforming in this manner, the forces associated with the collision are absorbed by the component tray assembly and not transferred to the passenger compartment of the vehicle. This reduces the risk to the passengers who are located within the vehicle.

For example, the component tray assembly may be located within an area of the vehicle that is between a seat bulkhead and a body (e.g., the service mainframe) of the vehicle. The component tray assembly may include one or more first connections that secure a first side of the component tray assembly to the seat bulkhead and one or more second connections that secure a second, opposite side of the component tray assembly to the body of the vehicle. In some examples, the first connection(s) and/or the second connection(s) may include bolted connections. In other examples, the first connection(s) and/or the second connection(s) may include any other type of connection mechanism (e.g., screw(s), rivet(s), pin connection(s), clip(s), adhesive connection(s), etc.).

The component tray assembly may also include one or more third connections that secure a third side of the component tray assembly to a first bracket and one or more fourth connections that secure a fourth, opposite side of the component tray assembly to a second bracket. In some examples, the third connection(s) and/or the fourth connection(s) may be of a different type of connection than the first connection(s) and the second connection(s). For instance, the third connection(s) and/or the fourth connection(s) may include clip connections. In other examples, the third connection(s) and/or fourth connection(s) may include any other type of connection mechanism. As will be described in more detail below, using bolted connections for the first and/or second sides of the component tray assembly and clip connections for the third and/or fourth sides component tray assembly may help to securely affix the component shelf to support the speakers or other components, while configuring the component tray assembly to deform during a collision.

As discussed above, the component tray assembly may include one or more openings for holding one or more components, such as speaker(s), subwoofer(s), wiring, ventilation ducts, wiring, and/or other components, though such a panel may not have any more openings and be used to provide aesthetic covering of otherwise automotive components. For example, the component tray assembly may include at least a first opening located proximate to the third side of the component tray assembly, a second opening located proximate to the fourth side of the component tray assembly, and a third opening located between the first opening and the second opening (e.g., proximate to the middle of the component tray assembly). In such an example, a first component (e.g., a first speaker) may be installed at least partially within the first opening, a second component (e.g., a second speaker) may be installed at least partially within the second opening, and a third component (e.g., a subwoofer) may be installed at least partially within the third opening. While this is just one configuration for the component tray assembly, in other examples, the component tray assembly may include any number of opening(s) and/or component(s).

The component tray assembly may include at least a component shelf and a cover disposed over the component shelf. In some examples, the component shelf may include a Polypropylene Impact Copolymer filled with glass fiber (e.g., PP-GF30), a thermoplastic material (e.g., PC-ABS), a polycarbonate material, a plastic material, a metal material, composites of the foregoing and/or any other type of material. In various examples, the component shelf may or may not be reinforced by one or more fibers, fabrics, metals, and/or other materials (e.g., carbon fibers, glass fibers, metal meshes, etc.). In various examples, the material properties may provide a tensile strength between 60 megapascals (MPa) and 100 MPa (e.g., 88.3 MPa), a flexural modulus between 4,000 MPa and 6,000 MPa (e.g., 4,810 MPa), and a flexural strength between 100 MPa and 200 MPa (e.g., 137 MPa).

In some instances, the material properties of the component shelf are configured to cause the component shelf to deform in a weakened region, either by bending or fracturing in response to a predetermined load. For example, certain material may provide the component shelf with flexibility such that the weakened region bends during a collision. However, other material may not provide the component shelf with such flexibility. As such, the component shelf is configured to fracture at the weakened region during the collision. As a non-limiting example, such a material may comprise carbon fiber.

In some examples, the cover may include a natural fiber board (e.g., cellulose based fibers) with a fabric disposed on the natural fiber board. However, in other examples, the cover may include any other type of material. By disposing the cover over the component shelf, the cover may be configured to hide the component(s) of the component tray assembly, such as the speakers(s) and/or subwoofer(s), from the passengers of the vehicle and provide a clean, smooth aesthetic. The cover may also provide acoustic diffusion and/or padding to protect the speakers from damage by objects. In some instances, the cover is attached to the component shelf using connections, such as clip connections. The connections are configured to hold the cover to the component shelf even when the component shelf deforms during a collision. This way, the cover does not impact the passengers within the vehicle.

In some examples, the component tray assembly (e.g., the component shelf) may include one or more ribs that extend from the first side of the component tray assembly to the second side of the component tray assembly (e.g., in the Y-direction) and/or one or more ribs that extend from the third side of the component tray assembly to the fourth side of the component tray assembly (e.g., in the X-direction). At least a portion of the rib(s) (e.g., the rib(s) in the X-direction) may be configured to help carry the load of the component(s). Additionally, and as described in detail below, at least a portion of the rib(s) (e.g., the rib(s) in the Y-direction) may be configured to help deform the component tray assembly during a collision (e.g., provide lateral stiffness so that the component tray assembly bends at the weakened region).

The component tray assembly may also include one or more notches located at the first side of the component tray assembly. In some examples, each notch may be configured to allow a respective headrest mount of a headrest to extend at least partially within the component tray assembly and to allow the component tray assembly to deform without impacting the headrest mounts. In some examples, the notch(s) may be configured to help create the weakened region of the component tray assembly, where the weakened region of the component tray assembly includes the region that deforms the most during the collision. For example, the weakened region may extend from the third side of the component tray assembly to the fourth side of the component tray assembly along the areas of the component tray assembly where the component opening(s) and/or notch(s) approximately align with one another. This may include the weakened region since it is the region of the component tray assembly with the least amount of material between the third side of the component tray assembly and the fourth side of the component tray assembly.

For example, during a collision, the force of the collision may cause the component tray assembly to deform (e.g., bend, break, fracture, etc.) along the weakened region of the component tray assembly. To allow the component tray assembly to deform, the first connection(s) that secure the first side of the component tray assembly to the seat bulkhead may hold the first side of the component tray assembly securely to the seat bulkhead. However, the third connection(s) may detach (e.g., separate or break) during the collision to allow the third side of the component tray assembly to release from the first bracket and the fourth connection(s) may detach (e.g., separate or break) during the collision to allow the fourth side of the component tray assembly to release from the second bracket. Further, based on where the impact occurs with the vehicle (e.g., in the rear of the vehicle during a rear end collision), the second side of the component tray assembly may tend to move upwards and towards the first side of the component tray assembly. Since the third and fourth sides of the component tray assembly are detached, and based on the location of the weakened region, this causes the component tray assembly to deform along the weakened region of the component tray assembly. By having the component tray assembly deform in such a manner during the collision, the forces associated with the collision are absorbed by the component tray assembly and are not transferred to the seat or passenger compartment of the vehicle.

In some examples, the component tray assembly may include one or more additional components. For a first example, the component tray assembly may include a humidity sensor, a smoke detector, and/or foam pads for absorbing noise. Additionally or alternatively, the component tray assembly may include one or more openings that operate as inlet vents for a ventilation system of the vehicle.

The techniques described herein can be implemented in a number of ways. Example implementations are provided below with reference to the following figures. Although some examples are discussed in the context of an autonomous vehicle, the methods, apparatuses, and systems described herein can be applied to any other type of vehicle (manually driven, land vehicle, aerial vehicle, water vehicle, robot, etc.). In some examples, when describing that a component is "proximate" to a side of the component tray assembly (and/or component shelf), the component may be closer to the side of the component tray assembly than a second, opposite side of the component tray assembly. Additionally, or alternatively, in some examples, when describing that a component is "proximate" to a location (e.g., a side, a center, etc.) of the component tray assembly, the component (e.g., a center of the component) may be within a threshold distance (e.g., 5 millimeters, 10 millimeters, 20 millimeters, 50 millimeters, etc.) to the location.

FIG. 1A illustrates a top view of a component shelf 102, in accordance with embodiments of the disclosure. As shown, the component shelf 102 may include a first side 104(1), a second side 104(2), a third side 104(3), and a fourth side 104(4). The first side 104(1) may be opposite to the second side 104(2) in the Y-direction of FIG. 1A. Additionally, the third side 104(3) may be opposite to the fourth side 104(4) in the X-direction of FIG. 1A.

The component shelf 102 may include a first speaker opening 106(1) located proximate to the third side 104(3) of the component shelf 102, a second speaker opening 106(2) located proximate to the fourth side 104(2) of the component shelf 102, and a third speaker opening 106(3) located between the first speaker opening 106(1) and the second speaker opening 106(2) and proximate to the center of the component shelf 102. While the example of FIG. 1A illustrates the component shelf 102 as including three speaker openings 106(1)-(3) (also referred to as "speaker openings 106"), in other examples, the component shelf 102 may include any number of speaker openings. Additionally, in other examples, the speaker openings 106 may be located at different locations on the component shelf 102.

Figure 1B:
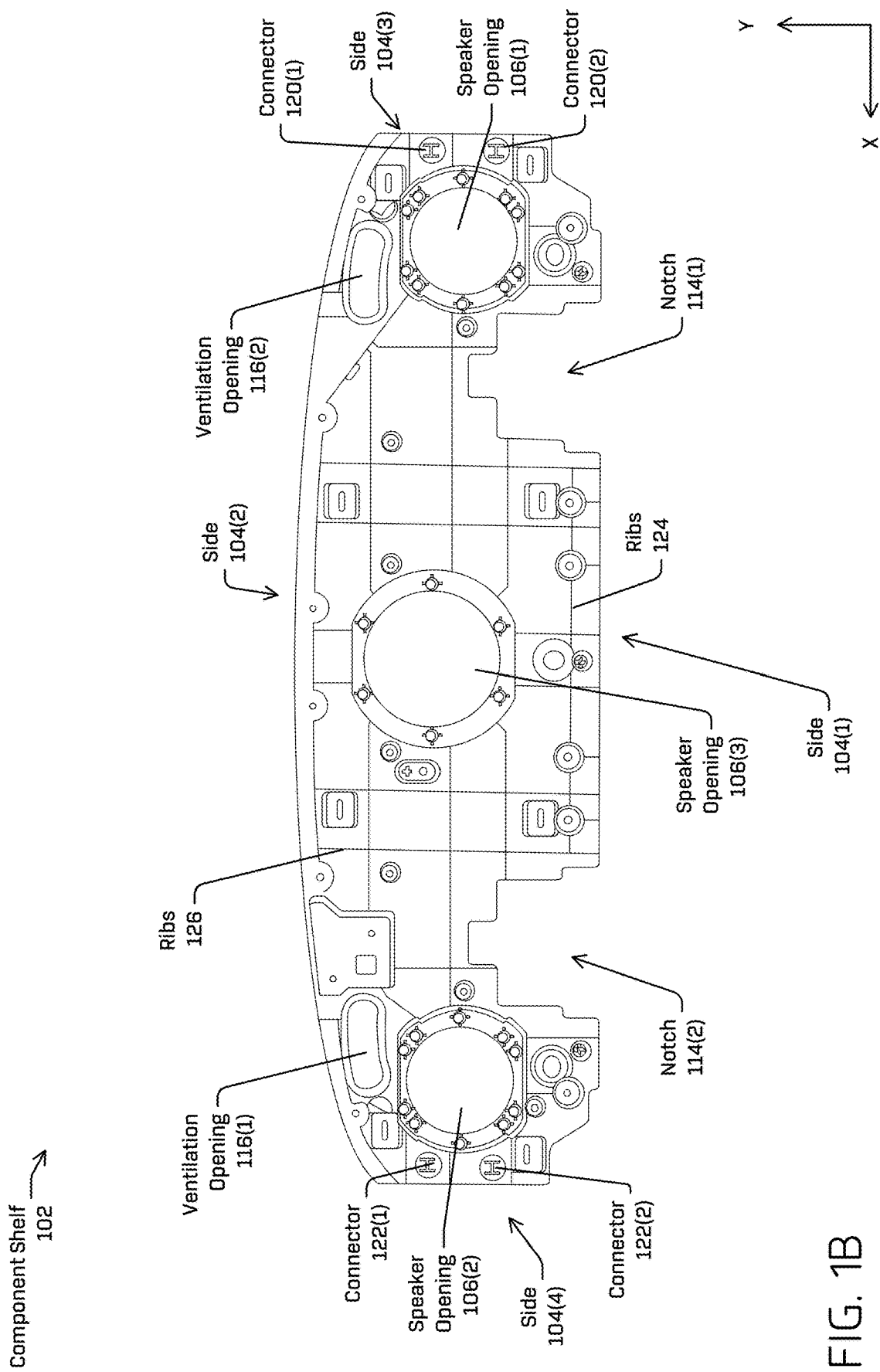
FIG. 1B illustrates a bottom view of the example component shelf, in accordance with examples of the disclosure.
Figure 1C:
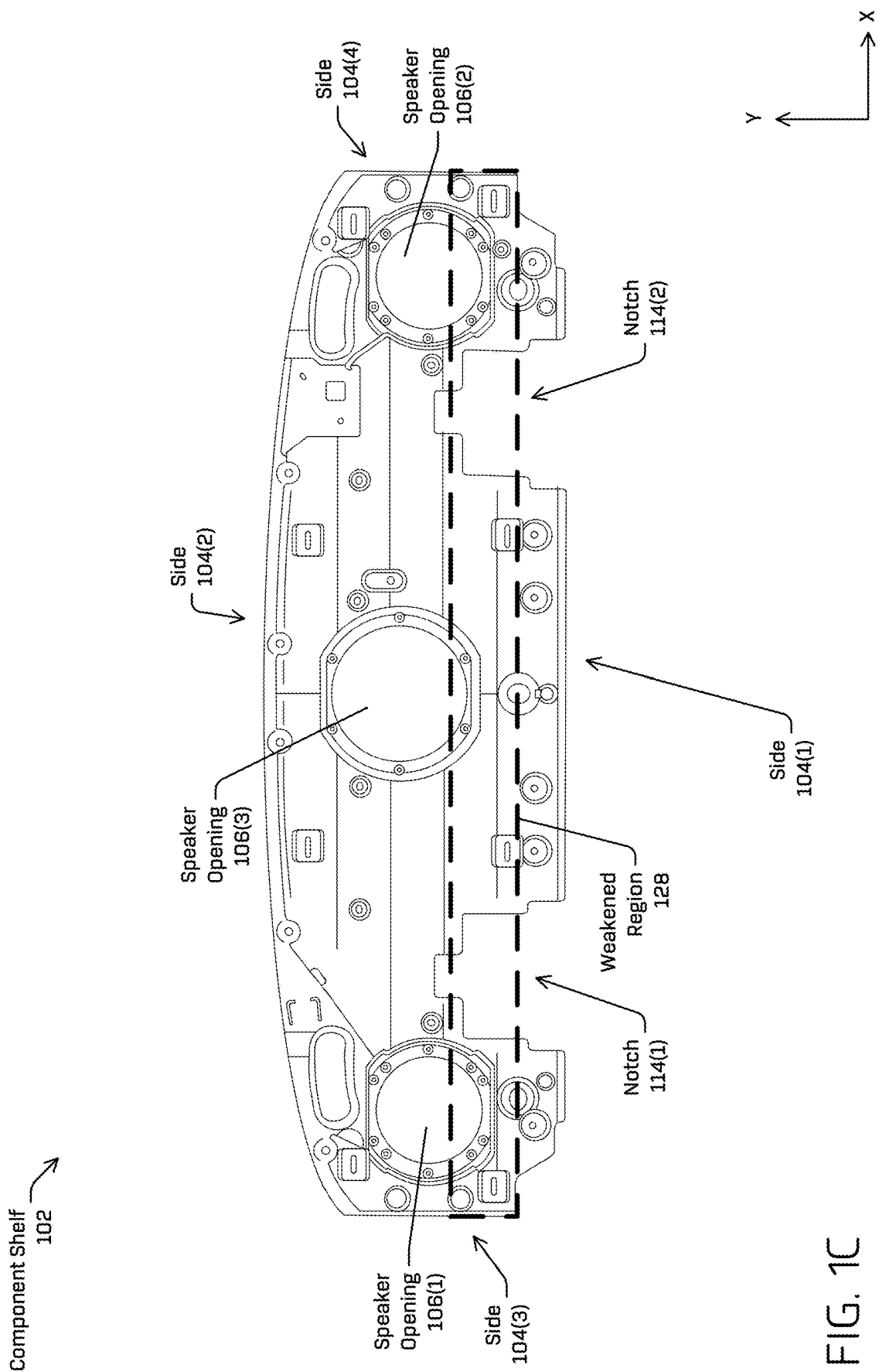
FIG. 1C illustrates a weakened region of the example component shelf, in accordance with examples of the disclosure.

In some instances, the locations and/or shapes of the speaker openings 106 are selected in order to create the weakened region of the component shelf 102, which is described with respect to FIG. 1C. More specifically, the locations and/or shapes of the speaker openings 106 are selected such that the weakened region of the component shelf 102 includes less material than other regions of the component shelf 102. This creates the weakened region 106, which is configured to deform during a collision in the manner prescribed herein.

Figure 6:
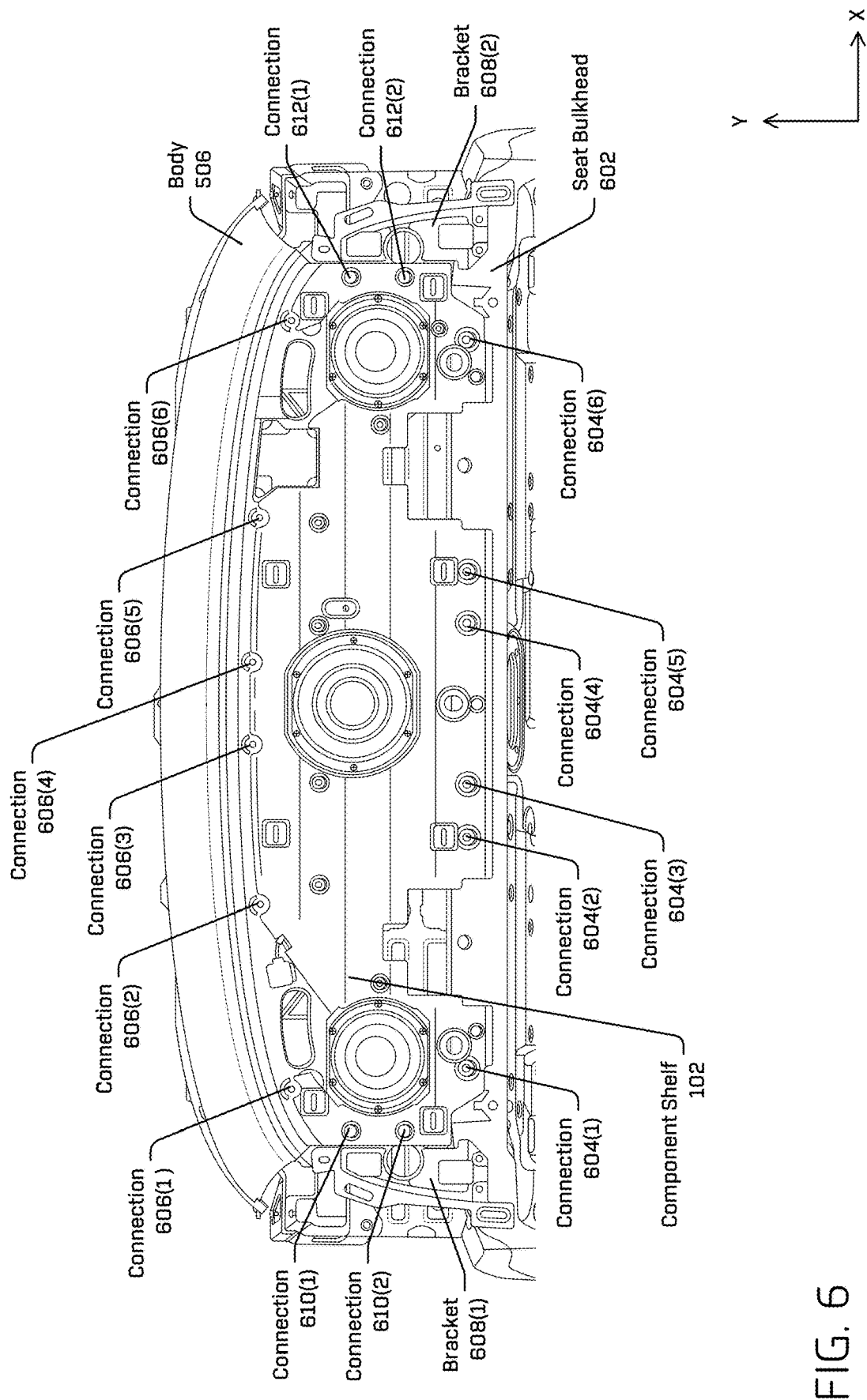
FIG. 6 illustrates an example of attaching the example component tray assembly within the vehicle, in accordance with examples of the present disclosure.

The component shelf 102 further includes connection points 108(1)-(6) (also referred to as "connection points 108") for attaching the first side 104(1) of the component shelf 102 to a first part of a vehicle, such as a seat bulkhead of the vehicle, and connection points 110(1)-(6) (also referred to as "connection points 110") for attaching the second side 104(2) of the component shelf 102 to a second part of the vehicle, such as a service mainframe of the vehicle (which is illustrated in FIG. 6). In some examples, the component shelf 102 may be attached to the first part of the vehicle and/or the second part of the vehicle using bolted connections. However, in other examples, the component shelf 102 may be attached to the first part of the vehicle and/or the second part of the vehicle using a different type of connection mechanism. Additionally, although the example of FIG. 1A illustrates six connection points 108 at the first side 104(1) of the component shelf 102 and six connection points 110 at the second side 104(2) of the component shelf 102, in other examples, the component shelf 102 may include any number of connection points 108 and/or connection points 110.

In some instances, the locations and/or number of the connections points 108 are selected in order to ensure that the component shelf 102 remains attached to the first part of the vehicle during a collision. For instance, and as shown in the example of FIG. 1A, the connection points 108 are approximately evenly distributed along the first side 104(1) of the component shelf 102. This distribution of the connection points 108 helps keep the entire first side 104(1) of the component shelf 102 attached to the first part of the vehicle while the component shelf 102 deforms.

Additionally, in some instances, locations and/or number of the connections points 110 are selected in order to ensure that the component shelf 102 remains attached to the second part of the vehicle during a collision. For instance, and as shown in the example of FIG. 1A, the connection points 110 are approximately evenly distributed along the second side 104(2) of the component shelf 102. This distribution of the connection points 110 helps keep the entire second side 104(2) of the component shelf 102 attached to the second part of the vehicle while the component shelf 102 deforms.

Figure 3:
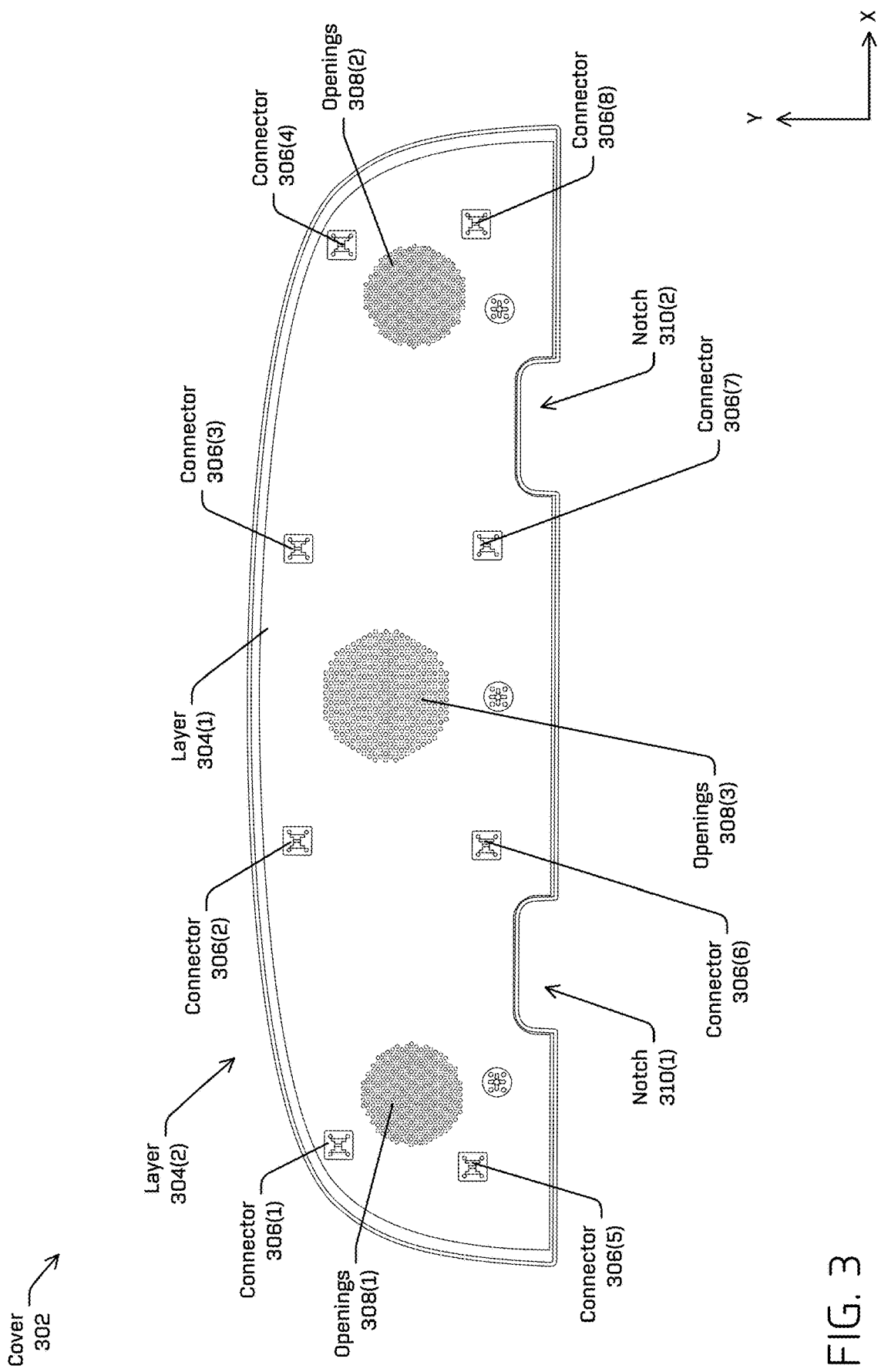
FIG. 3 illustrates a cover for the example component shelf, in accordance with examples of the present disclosure.

The component shelf 102 may further include connectors 112(1)-(4) (also referred to as "connectors 112") for connecting the component shelf 102 to a cover, which is illustrated in FIG. 3. In some examples, the connectors 112 may include clips. However, in other examples, the connectors 112 may include any other type of connection mechanism. In the example of FIG. 1A, the component shelf 102 includes eight connectors 112 (although only four connectors 112 are labeled for clarity reasons) located proximate to the sides 104(1)-(4) of the component shelf 102. However, in other examples, the component shelf 102 may include any number of connectors. Additionally, in other examples, the connectors 112 may be located at different locations on the component shelf 102.

The component shelf 102 may further include notches 114(1)-(2) (also referred to as "notches 114") located at the first side 104(1) of the component shelf 102. As shown in FIG. 1C, the notches 114 along with the speaker openings 106 create a weakened region of the component shelf 102 that helps deform the component shelf 102 during a collision. Additionally, each of the notches 114 may be configured to allow a respective headrest mount of a headrest to extend at least partially within the component shelf 102. Although the example of FIG. 1A illustrates two notches 114, in other examples, the component shelf 102 may include any number of notches 114 located along the first side 104(1) of the component shelf 102.

Figure 9:
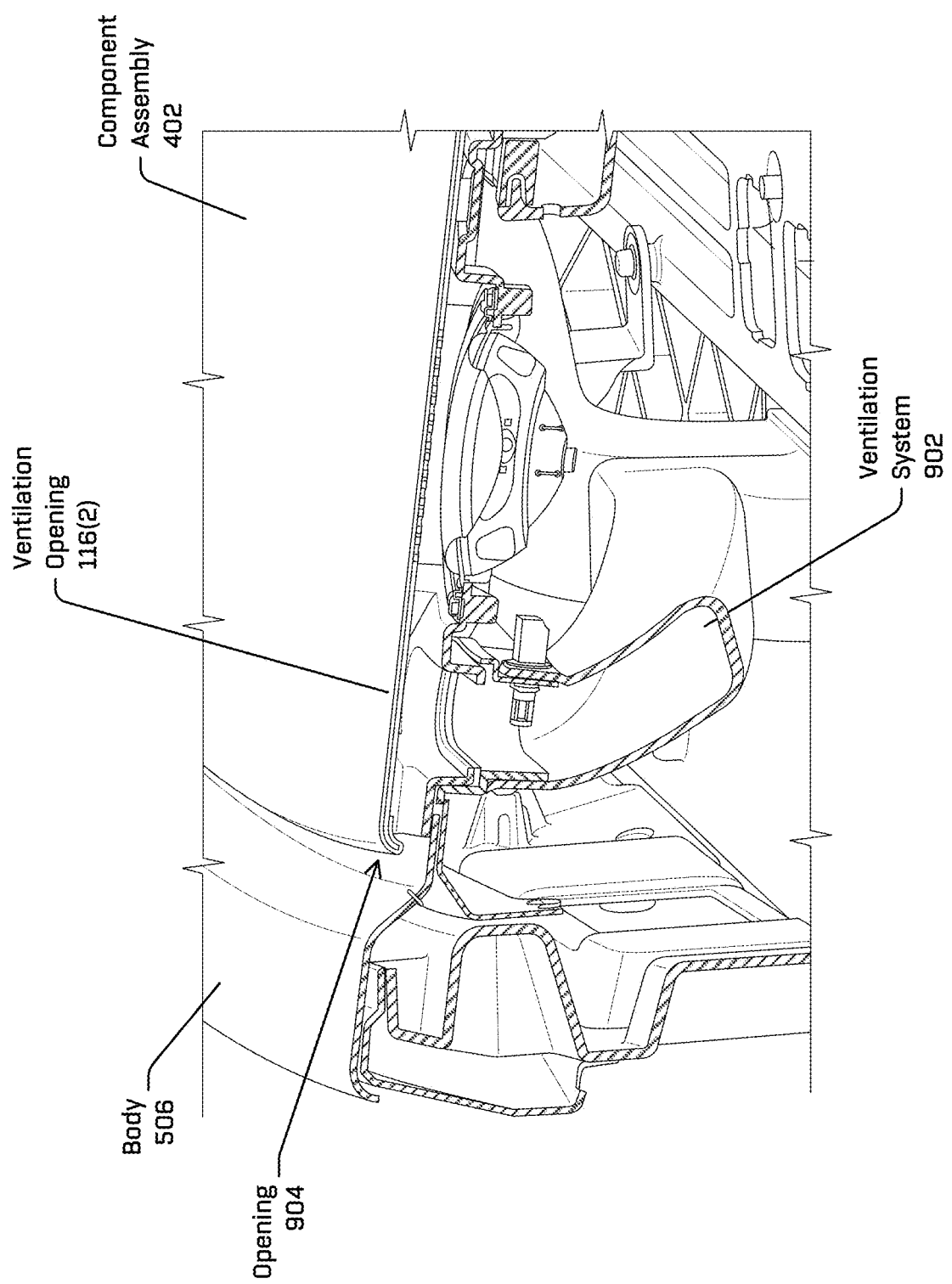
FIG. 9 illustrates inlets of the example component tray assembly for a ventilation system of the vehicle, in accordance with examples of the present disclosure.

As further illustrated in the example of FIG. 1A, the component shelf 102 may include ventilation openings 116(1)-(2) (also referred to as "ventilation openings 116") that operate as inlets for a ventilation system of the vehicle, which is illustrated in FIG. 9. Although the example of FIG. 1A illustrates the component shelf 102 as including two ventilation openings 116, in other examples, the component shelf 102 may include any number of ventilation openings. Additionally, in some examples, the ventilation openings 116 may be located at different locations on the component shelf 102.

In some instances, the dimensions of the ventilation openings 116 are selected such that the ventilation openings 116 allow a necessary volume of air to travel into the ventilation system. Additionally, the locations of the ventilation openings 116 are selected such that air from various potions of the vehicle is able to travel through the ventilation openings 116 and into the ventilation system. For instance, and a shown in the example of FIG. 1A, the ventilation openings 116 are located proximate to the third side 104(3) and the fourth side 104(4) of the component shelf 102. This way, air from either side of the vehicle is able to travel through the ventilation openings 116 and into the ventilation system.

The top of the component shelf 102 may further include ribs 118 (although only one rib 118 is labeled for clarity reasons). In some examples, the ribs 118 may be configured to help carry the load of the component(s) of the component shelf 102. For instance, the ribs 118 may be configured to provide rigidity to the component shelf 102 in order to support a weight associated with at least the speaker(s). Additionally, or alternatively, in some examples, the ribs 118 may be configured to help deform the component shelf 102 during a collision. For instance, and as illustrated in FIG. 1C, the ribs 118 may be configured to help deform the component shelf 102 along the weakened region during the collision.

FIG. 1B illustrates a bottom view of the component shelf 102 from FIG. 1A, in accordance with embodiments of the disclosure. As shown, the bottom of the component shelf 102 includes connectors 120(1)-(2) (also referred to as "connectors 120") for attaching the third side 104(3) of the component shelf 102 to a third part of the vehicle, such as a first bracket of the vehicle, and connectors 122(1)-(2) (also referred to as "connectors 122") for attaching the fourth side 104(4) of the component shelf 102 to a fourth part of the vehicle, such as a second bracket, which is illustrated in FIG. 6. In some examples, the connectors 120 and/or the connectors 122 may include clips. However, in other examples, the connectors 120 and/or the connectors 122 may include any other type of connection mechanism. In the example of FIG. 1B, the component shelf 102 includes two connectors 120 located at the third side 104(3) of the component shelf 102 and two connectors 122 located at the fourth side 140(4) of the component shelf 102. However, in other examples, the component shelf 102 may include any number of connectors located at the third side 104(3) and/or fourth side 104(4).

As further illustrated in the example of FIG. 1B, the bottom of the component shelf 102 may include ribs 124 (although only one rib 124 is labeled for clarity reasons) that extend from the first side 104(1) of the component shelf 102 to the second side 104(2) of the component shelf 102 (e.g., in the Y-direction) and ribs 126 (although only one rib 126 is labeled for clarity reasons) that extend from the third side 104(3) of the component shelf 102 to the fourth side 104(4) of the component shelf 102 (e.g., in the X-direction). At least a portion of the ribs (e.g., the ribs 124 that extend in the X-direction) may be configured to help carry the load of the component(s), such as the speaker(s). Additionally, at least a portion of the ribs (e.g., the ribs 126 that extend in the Y-direction) may be configured to help deform the component shelf 102 during a collision.

FIG. 1C illustrates a weakened region 128 of the component shelf 102 from FIG. 1A, in accordance with embodiments of the disclosure. As shown, the weakened region 128 may include an area of the component shelf 102 that is proximate to the first side 104(1) of the component shelf 102. For example, the weakened region 128 may include an area of the component shelf 102 that includes a first portion of the component shelf 102 that is between the third side 104(3) and the first speaker opening 106(1), a second portion of the component shelf 102 that is between the first speaker opening 106(1) and the first notch 114(1), a third portion of the component shelf 102 that is between the first notch 114(1) and the third speaker opening 106(3), a fourth portion of the component shelf 102 that is between the third speaker opening 106(3) and the second notch 114(2), a fifth portion of the component shelf 102 that is between the second notch 114(2) and the second speaker opening 106(2), and a sixth portion of the component shelf 102 that is between the second speaker opening 106(2) and the fourth side 104(4).

Figure 10:
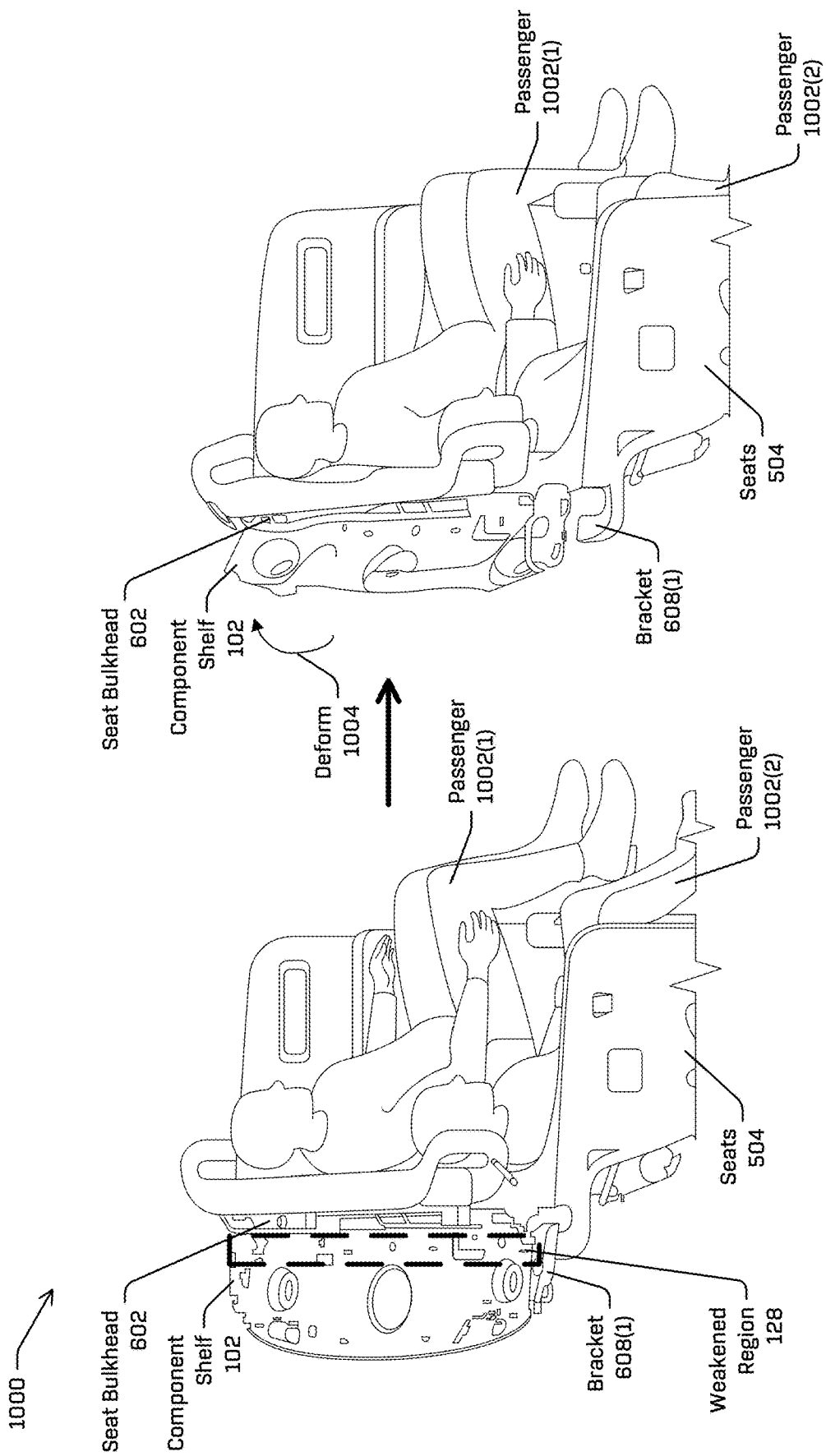
FIG. 10 illustrates a first example of the example component shelf deforming during a collision, in accordance with examples of the present disclosure.
Figure 11:
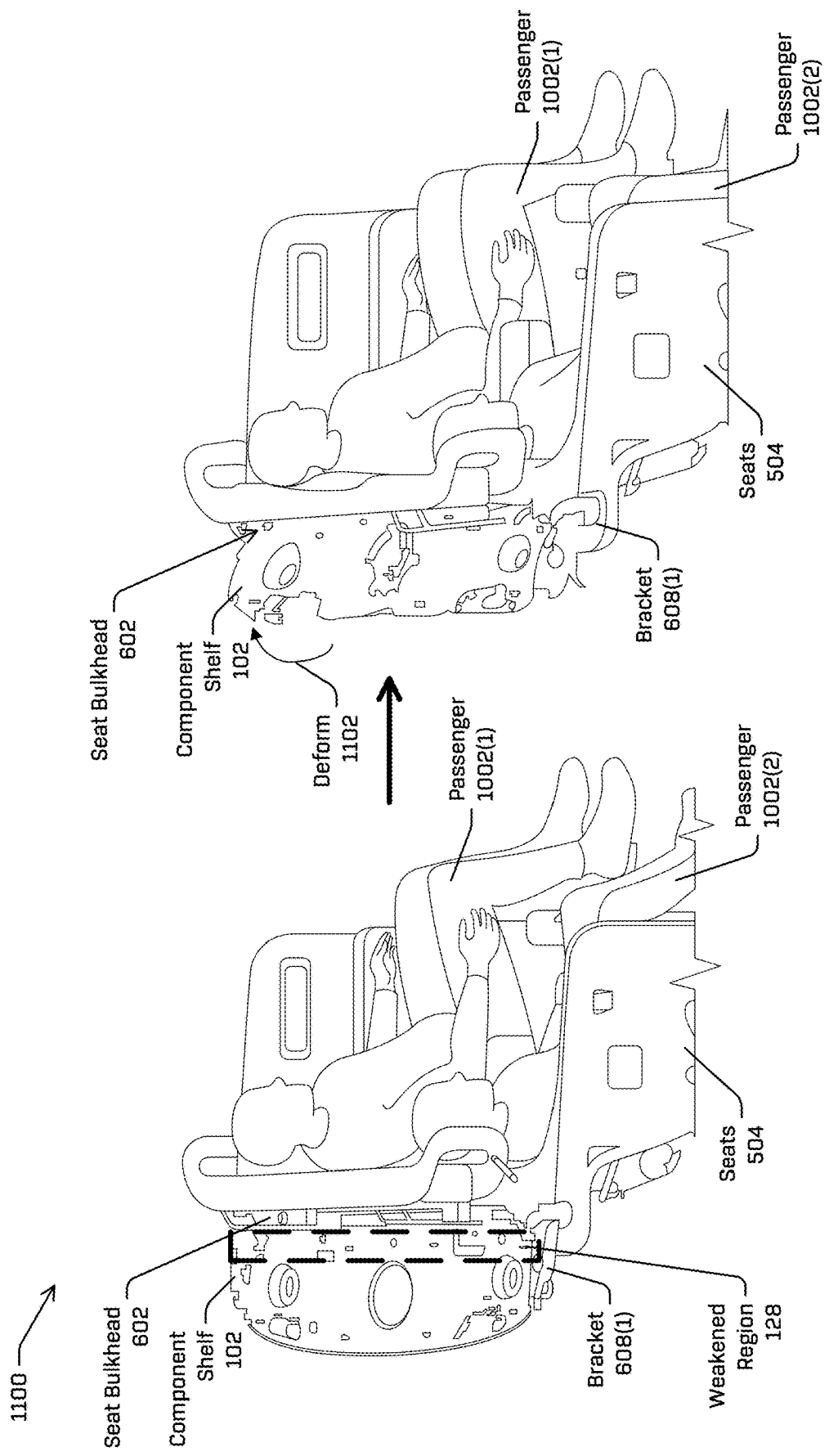
FIG. 11 illustrates a second example of the example component shelf deforming during a collision, in accordance with examples of the present disclosure.

In some examples, the weakened region 128 may include the area from the third side 104(3) of the component shelf 102 to the fourth side 104(4) of the component shelf 102 that includes the least amount of material. This is due to the speaker openings 106 and the notches 114. As such, when a force is applied to the component shelf 102, such as during a collision, the force may cause the component shelf 102 to deform, such as bend and/or fracture, along the weakened region 128. Because the weakened region 128 deforms in such a manner, the component shelf 102 may minimize the force that is imparted to the seats of the vehicle, which increases the safety for the passengers of the vehicle. Examples of the component shelf 102 deforming are illustrated in the examples of FIG. 10 and FIG. 11.

Figure 2A:
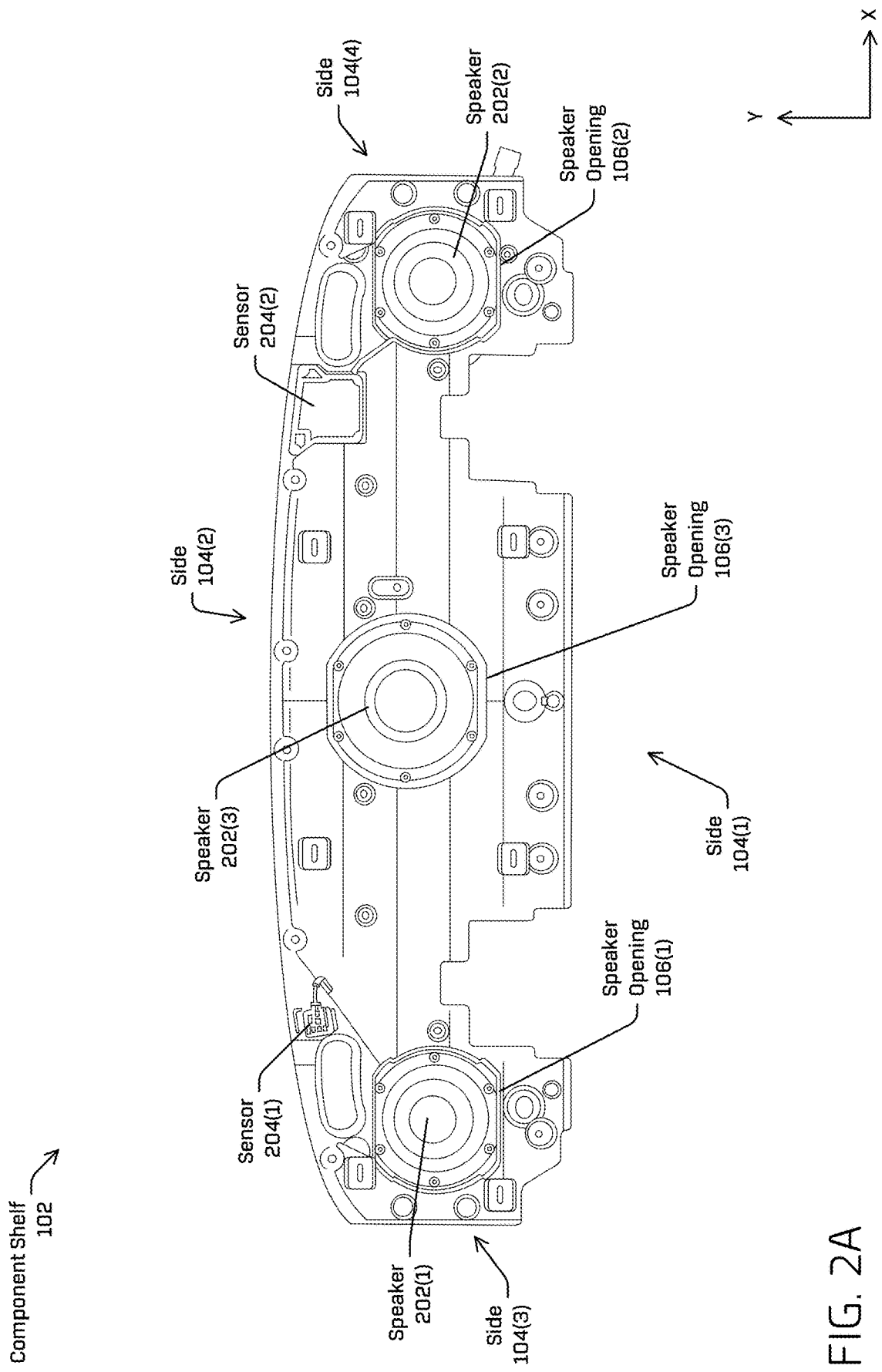
FIG. 2A illustrates a top view of the example component shelf with components attached, in accordance with examples of the disclosure.

FIG. 2A illustrates a top view of the component shelf 102 with components attached, in accordance with embodiments of the disclosure. As shown, the component shelf 102 may include speakers 202(1)-(3) (also referred to as "speakers 202") disposed at least partially within the speaker openings 106. For example, the first speaker 202(1) may be disposed at least partially within the first speaker opening 106(1), the second speaker 202(2) may be disposed at least partially within the speaker opening 202(2), and the third speaker 202(3) may be disposed at least partially within the third speaker opening 106(3). In some examples, one or more of the speakers (e.g., the third speaker 202(3)) may include a subwoofer.

The component shelf 102 may further include sensors 204(1)-(2) (also referred to as "sensors 204"). In some examples, the first sensor 204(1) may include a humidity detector and the second sensor 204(2) may include a smoke detector. However, in other examples, the sensors 204 may include any other type of sensor. Additionally, although the example of FIG. 2A illustrates two sensors 204 located proximate to the second end 104(2) of the component shelf 102, in other examples, one or more sensors may be located at different locations on the component shelf 102.

Figure 2B:
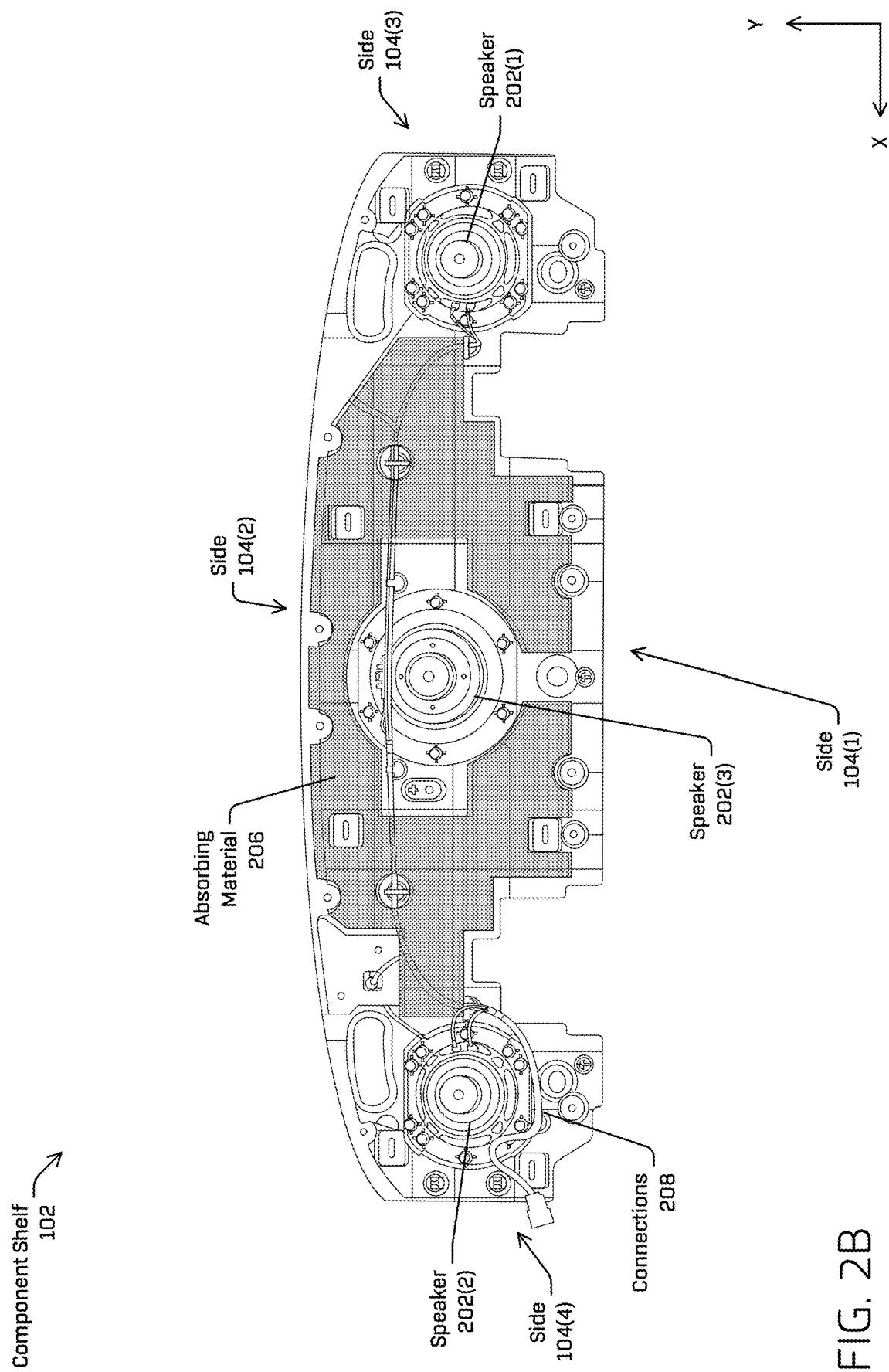
FIG. 2B illustrates a bottom view of the example component shelf with components attached, in accordance with examples of the disclosure.

FIG. 2B illustrates a bottom view of the component shelf 102 with components attached, in accordance with embodiments of the disclosure. As shown, the bottom of the component shelf 102 may include an absorbing component 206 for absorbing noise, such as the sound that is output by the speakers 202. In some examples, the absorbing component 206 includes a foam pad. However, in other examples, the absorbing material 206 may include any other type of material that is capable of absorbing the noise. Although the example of FIG. 2B illustrates the absorbing material 206 as being located on only a portion of the component shelf 102, in other examples, an entirety of the bottom of the component shelf 102 may include the absorbing material 206.

The bottom of the component shelf 102 may further include connections 208 for the speakers 202 and/or sensors 204 of the component shelf 102. For instance, the connections 208 may be configured to transmit audio data to the speakers 202. Additionally, the connections 208 may be configured to provide power to the sensors 204 and/or receive sensor data generated by the sensors 204. In the example of FIG. 2B, the connections 208 may begin proximate to the fourth side 104(4) of the component shelf 102 and then extend along the bottom of the component shelf 102 to the speakers 202 and/or the sensors 204.

FIG. 3 illustrates a cover 302 for the component shelf 102, in accordance with embodiments of the present disclosure. The cover 302 may include at least a first layer 304(1) and a second layer 304(2) (which is better illustrated in FIG. 4). In some examples, the first layer 304(1) includes a natural fiber board and the second layer 304(2) includes a fabric. However, in other examples, the first layer 304(1) and/or the second layer 304(2) may include any other type of material. As shown, the cover 302 may include the second layer 304(2) completely disposed over the first layer 304(1). However, in other examples, the second layer 304(2) may be disposed over only a portion of the first layer 304(1).

The first layer 304(1) may include connectors 306(1)-(8) (also referred to as "connectors 306") for attaching the cover 302 to the component shelf 102. For example, the connectors 306 may include clips that attach to the connectors 112 of the component shelf 102. However, in other examples, the connectors 306 may include any other type of connecting mechanism that is able to connect to the connectors 112 of the component shelf 102. The first layer 304(1) may further include openings 308(1)-(3) (also referred to as "openings 308"). The openings 308 may respectively be disposed over the speakers 202 and thus, allow the sound output by the speakers 202 to travel through the cover 302. For example, when the cover 302 is disposed over the component shelf 102, the first opening 308(1) may disposed over the first speaker opening 106(1) (and/or the first speaker 202(1)), the second opening 308(2) may be disposed over the second speaker opening 106(2) (and/or the second speaker 202(2)), and the third opening 308(3) may be disposed over the third speaker opening 106(3) (and/or the third speaker 202(3)).

The cover 302 may further include notches 310(1)-(2) (also referred to as "notches 310"). The first notch 310(1) of the cover 302 may align with the first notch 114(1) of the component shelf 102 and the second notch 310(2) of the cover 302 may align with the second notch 114(2) of the component shelf 102. Each of the notches 310 may be configured to allow a respective headrest mount of a headrest to extend at least partially within the cover 302, which is illustrated in FIG. 5.

Figure 4:
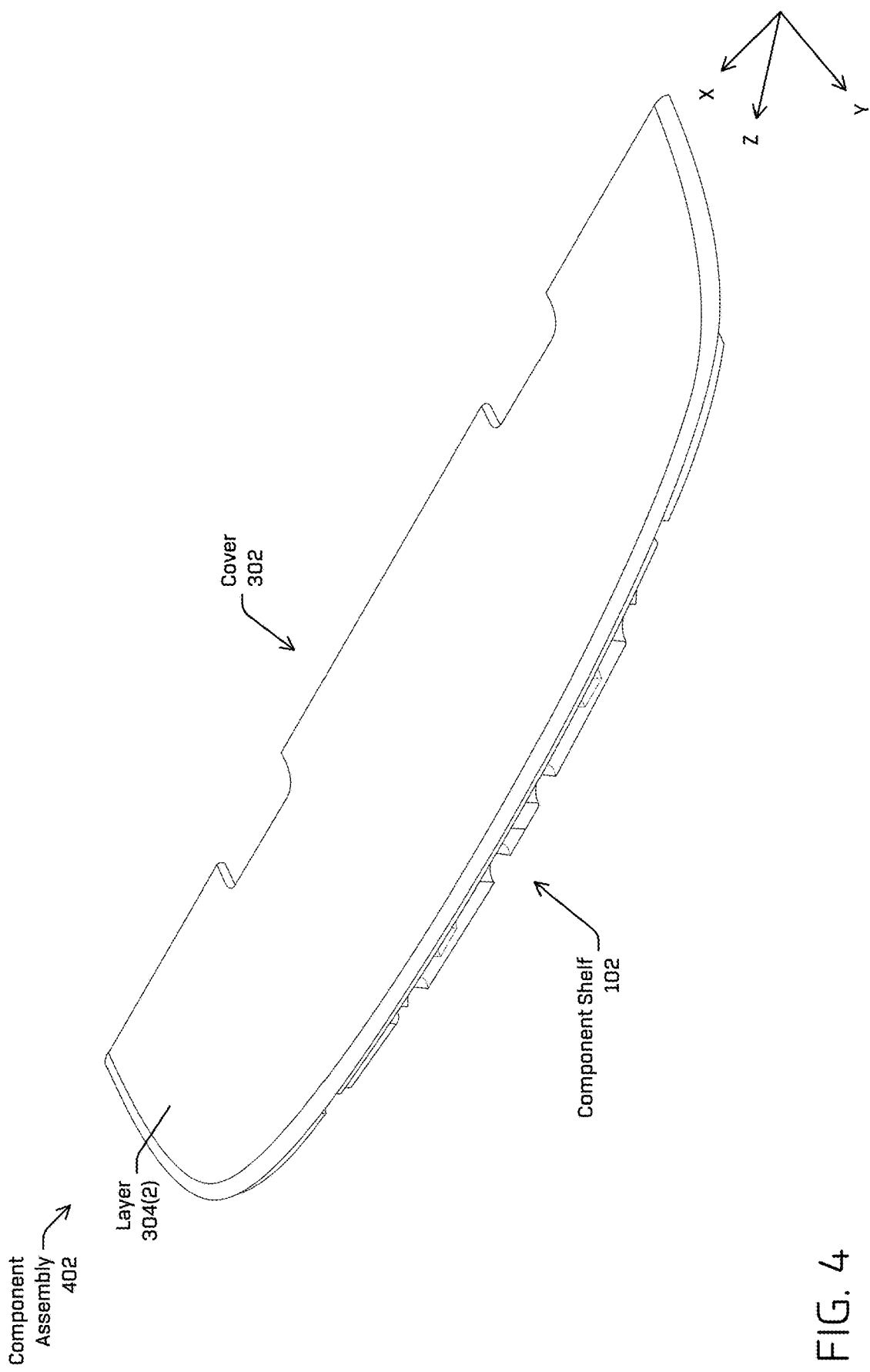
FIG. 4 illustrates an example component tray assembly that includes the example component shelf and the cover, in accordance with examples of the present disclosure.

FIG. 4 illustrates a component tray assembly 402 that includes the component shelf 102 and the cover 302, in accordance with embodiments of the present disclosure. As shown, the component tray assembly 402 includes the cover 302 disposed over the top of the component shelf 102. In the example of FIG. 4, the cover 302 is completely disposed over the top of the component shelf 102. However, in other examples, the cover 302 may only be disposed over a portion of the component shelf 102.

Figure 5:
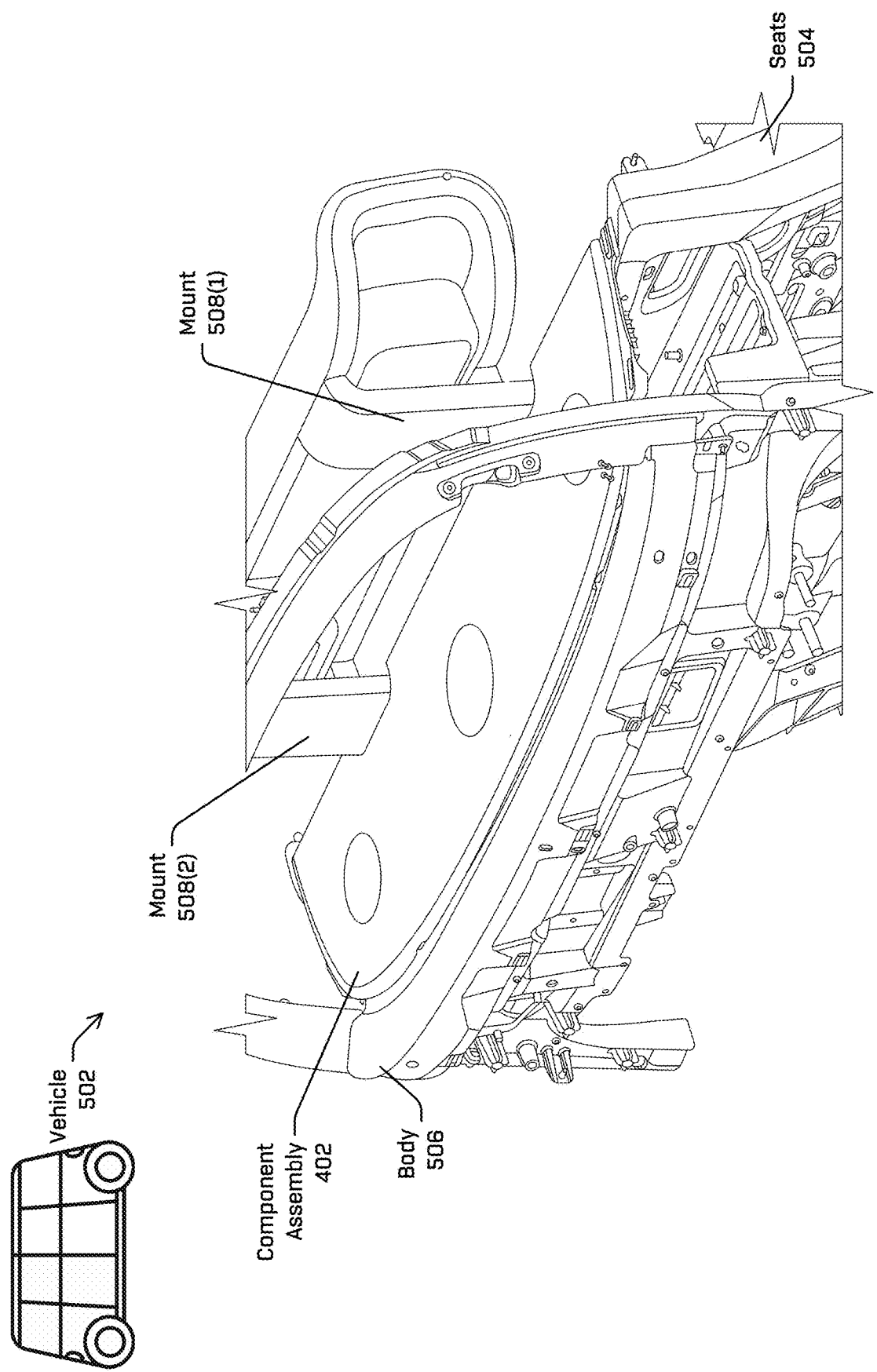
FIG. 5 illustrates an example vehicle that includes the example component tray assembly, in accordance with examples of the present disclosure.

FIG. 5 illustrates a vehicle 502 that includes the component tray assembly 402 installed, in accordance with embodiments of the present disclosure. As shown, the component tray assembly 402 is located in an area that is between seats 504 (e.g., the rear seats) of the vehicle 502 and a body 506 (e.g., the service mainframe) of the vehicle 502. The component tray assembly 402 is installed in such a way that a first headrest mount 508(1) is at least partially located within the first notch 310(1) (and/or the first notch 114(1)) and a second headrest mount 508(1) is located at least partially within the second notch 310(2) (and/or the second notch 114(2)).

Although the example of FIG. 5 illustrates the component tray assembly 402 as being installed in the rear of the vehicle 502, in other examples, the component tray assembly 402 may be installed at a different location within the vehicle 502. For example, the component tray assembly 402 may be installed at the front of the vehicle 502.

FIG. 6 illustrates an example of attaching the component tray assembly 402 within the vehicle 502, in accordance with embodiments of the present disclosure. As shown, the component shelf 102 may attach to a seat bulkhead 602 of the vehicle 502 at the connection points 108 and attach to the body 506 of the vehicle 502 at the connection points 110. For example, the component shelf 102 may include connections 604(1)-(6) (also referred to as "connections 604") with the seat bulkhead 602. Additionally, the component shelf 102 may include connections 606(1)-(6) (also referred to as "connections 606") with the body 408. In some examples, the connections 604 and/or the connections 606 include bolted connections. In other examples, the connections 604 and/or the connections 606 include a different type of connection mechanism.

The component shelf 102 may also attach to a first bracket 608(1) of the vehicle 502 at the connectors 120 and attach to a second bracket 608(2) of the vehicle 502 at the connectors 122. For example, the component shelf 102 may include connections 610(1)-(2) (also referred to as "connections 610") with the first bracket 608(1) and connections 612(1)-(2) (also referred to as "connections 612") with the second bracket 608(2). In some examples, the connections 610 and/or the connections 612 include clipped connections. In other examples, the connections 610 and/or the connections 612 include a different type of connection mechanism.

Figure 7:
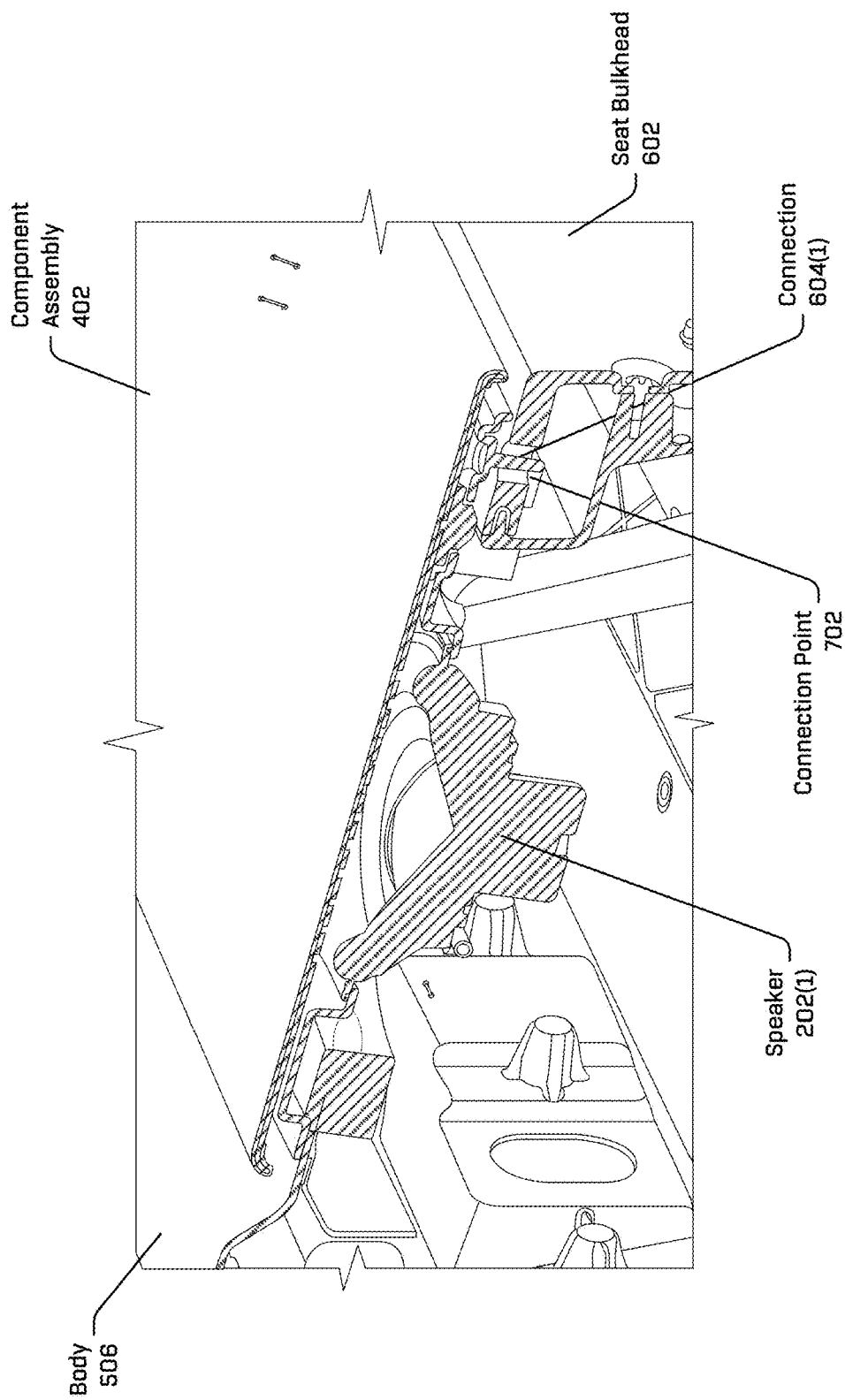
FIG. 7 illustrates an example of attaching the example component tray assembly to the seat bulkhead, in accordance with examples of the present disclosure.

FIG. 7 illustrates an example of the component tray assembly 402 attaching to the seat bulkhead 602 using a bolted connection, in accordance with embodiments of the present disclosure. As shown, the seat bulkhead 602 may include connection points 702 (although only one connection point 702 is illustrated for clarity reasons) that align with the connection points 108 of the component shelf 102. In some examples, the first connection 604(1) may then include a bolt that attaches the component shelf 102 to the seat bulkhead 602.

Figure 8:
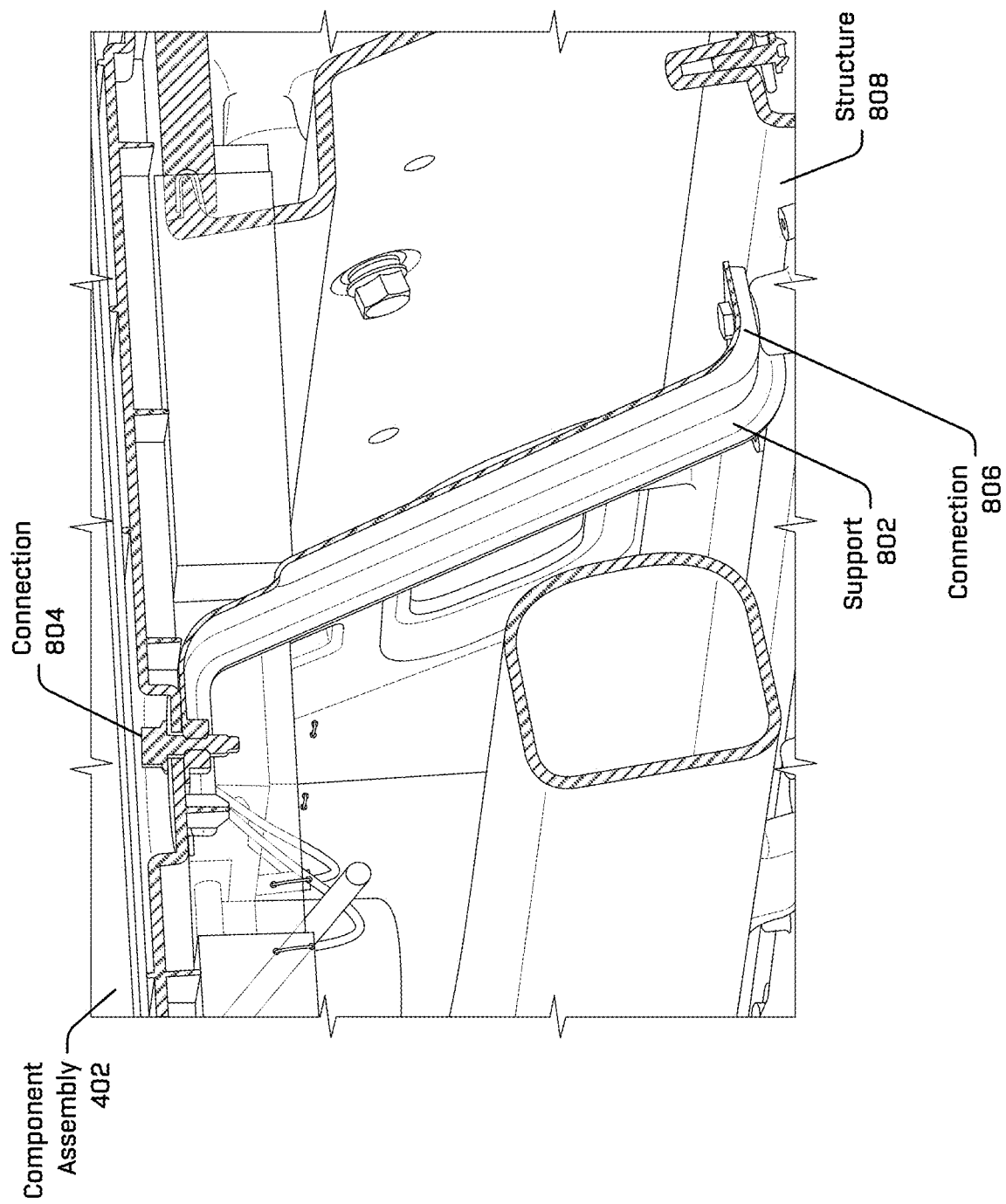
FIG. 8 illustrates an example of an additional support for the example component tray assembly, in accordance with examples of the present disclosure.

FIG. 8 illustrates an example of an additional support 802 for the component tray assembly 402, in accordance with embodiments of the present disclosure. As shown, the support 802 may include a connection 804 with the component tray assembly 402 and another connection 806 with a structure 808 of the vehicle 502. The support 802 may attach at a location of the component tray assembly 402 that is located proximate to the center of the component tray assembly 402. As such, the support 802 may be configured to support the load that occurs at the center of the component tray assembly 402.

In some instances, the connection 804 is configured to release and/or break during a collision. For example, the connection 804 may include a clip connection. This way, the component tray assembly 402 is able to deform about the weakened region 128 of the component tray assembly 402, which is illustrated in the examples of FIG. 10 and FIG. 11.

FIG. 9 illustrates inlets of the component tray assembly 402 for a ventilation system 902 of the vehicle 502, in accordance with embodiments of the present disclosure. As shown, the component tray assembly 402 includes the second ventilation opening 116(2) that acts as the inlet for the ventilation system 902. For instance, air within the vehicle 502, such as above the component tray assembly 402, may travel through the cover 302 and the second ventilation opening 116(2) and into the ventilation system 902. However, in other examples, the second ventilation opening 116(2) may act as the output for the ventilation system 902.

As also shown in the example of FIG. 9, there may be an opening 904 between the component tray assembly 402 and the body 506 of the vehicle 502. The opening 904 may also act as an inlet for the ventilation system 902. For example, air may travel through the opening 904 and into the ventilation system 902. However, in other examples, the opening 904 may act as the output for the ventilation system 902.

FIG. 10 illustrates a first example 1000 of the component shelf 102 deforming during a collision, in accordance with embodiments of the present disclosure. For instance, and at a first time represented by the left illustration, passengers 1002(1)-(2) (also referred to as "passengers 1002") may be seated within the vehicle 502. As shown, the component shelf 102 is located in an area behind the passengers 1002. The component shelf 102 is attached to at least the seat bulkhead 602 and the brackets 608. Additionally, the component shelf 102 includes the weakened region 128 that is located proximate to the seat bulkhead 602 of the vehicle 502.

At a second time represented by the right illustration, the vehicle 502 may experience a collision, such as a rear end collision. Based on the force of the collision, the component shelf 102 may release (e.g., break) from the brackets 608, but stay attached to the seat bulkhead 602. Additionally, the component shelf may deform, along the weakened region 128, away from the seat bulkhead 602 from a longitudinal direction to minimize forces imparted to the seats 504, which is represented by deform 1004. In other words, the majority of the forces from the collision are absorbed by the component shelf 102 and not imparted to the seats 504, which increases the safety of the passengers 1002 within the vehicle 502.

FIG. 11 illustrates a second example 1100 of the component shelf 102 deforming during a collision, in accordance with embodiments of the present disclosure. For instance, and again at the first time represented by the left illustration, the passengers 1002 may be seated within the vehicle 502. As shown, the component shelf 102 is located in the area behind the passengers 1002. The component shelf 102 is attached to at least the seat bulkhead 602 and the brackets 608. Additionally, the component shelf 102 includes the weakened region 128 that is located proximate to the seat bulkhead 602 of the vehicle 502.

At a second time represented by the right illustration, the vehicle 502 may experience a collision, such as a rear end collision. Similar to the first example of FIG. 10, based on the force of the collision, the component shelf 102 may release (e.g., break) from the brackets 608, but stay attached to the seat bulkhead 602. Additionally, the component shelf may deform, along the weakened region 128, away from the seat bulkhead 602 from a longitudinal direction to minimize forces imparted to the seats 504, which is represented by deform 1102. However, the component shelf 102 may further fracture in the example of FIG. 11.

In other words, based on the material of the component shelf 102, the component shelf 102 may either fracture when deforming, which is illustrated by the second example of FIG. 11, or not fracture when deforming, which is illustrated by the first example of FIG. 10. However, in both examples, the component shelf 102 is able to minimize the forces that are imparted on the seats 504.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "can," or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

Example Clauses

A: A vehicle comprising: an end of a body; a seat bulkhead spaced inwardly from the body; a component shelf located in an area between the end of the body and the seat bulkhead, the component shelf comprising: a first connection point to the seat bulkhead at a first side of the component shelf; a second connection point to the body at a second side of the component shelf, the second side being opposite to the first side; and an opening; a component disposed at least partially within the opening; and a weakened region, wherein, upon a collision of the vehicle along a longitudinal direction, the weakened region deforms to minimize forces imparted to a seat of the vehicle.

B: The vehicle as recited in paragraph A, wherein: the opening comprises a first opening located proximate to a third side of the component shelf; the component comprises a first speaker disposed at least partially within the first opening; the component shelf further comprises: a second opening located proximate to a fourth side of the component shelf, the fourth side being opposite to the third side; and a third opening located between the first opening and the second opening; and the vehicle further comprises: a second speaker disposed at least partially within the second opening; and a third speaker disposed at least partially within the third opening.

C: The vehicle as recited in either paragraph A or paragraph B, wherein the component shelf further comprises: a first clip connection to a first bracket at a third side of the component shelf; and a second clip connection to a second bracket at a fourth side of the component shelf, the fourth side being opposite to the third side, wherein the first clip connection and the second clip connection are releasable during the collision in order to allow the weakened region to deform, and wherein the deformation of the weakened region comprises one or more of a bending or a fracturing.

D: The vehicle as recited in any of paragraphs A-C, the component shelf further comprising: a first notch located at the first side of the component shelf; and a second notch located at the first side of component shelf, wherein the weakened region comprises at least: a first portion of the component shelf that is located between the first notch and the opening; and a second portion of the component shelf that is located between the opening and the second notch.

E: The vehicle as recited in any of paragraphs A-D, wherein the component shelf further comprises one or more ribs that extend from a third side of the component shelf to a fourth side of the component shelf, the one or more ribs configured to provide rigidity to the component shelf in order to support a weight associated with at least the component.

F: The vehicle as recited in any of paragraphs A-E, wherein the component shelf comprises a polycarbonate material that is configured to bend when a force is applied to the second end.

G: An assembly comprising: a component shelf comprising: a first connection point for attaching a first side of the component shelf to a seat bulkhead of a vehicle; a second connection point for attaching a second side of the component shelf to an end of a body of the vehicle, the second side being opposite to the first side; and an opening; and a component disposed at least partially within the opening, wherein at least a portion of the component shelf is configured to deform during a collision in order to minimize forces imparted to a seat of the vehicle.

H: The assembly as recited in paragraph G, wherein the component shelf further comprises: a third connection point for attaching a third side of the component shelf to a first bracket; and a fourth connection point for attaching a fourth side of the component shelf to a second bracket, the fourth side being opposite to the third side, wherein, during the collision, the component shelf is releasable at the third connection point and the fourth connection point in order to allow the component shelf to deform.

I: The assembly as recited in paragraph G or paragraph H, wherein: the opening is a first opening located proximate to a third side of the component shelf; and the component shelf further comprises: a second opening located proximate to a fourth side of the component shelf, the fourth side being opposite to the third side; and a third opening located between the first opening and the second opening.

J: The assembly as recited in any of paragraphs G-I, wherein: the component is a first speaker disposed at least partially within the first opening; and the assembly further comprises: a second speaker disposed at least partially within the second opening; and a third speaker disposed at least partially within the third opening.

K: The assembly as recited in any of paragraphs G-J, wherein the component shelf further comprises: a first notch located at the first side of the component shelf; and a second notch located at the first side of the component shelf and spaced a distance from the first notch; and a region that is configured to bend during the collision, the region including at least: a first portion of the component shelf that is located between the first notch and the opening; and a second portion of the component shelf that is located between the opening and the second notch.

L: The assembly as recited in any of paragraphs G-K, further comprising a cover disposed over at least a portion of the component shelf, wherein the cover comprises at least: a natural fiber board; a fabric disposed over the natural fiber board; and one or more connections that are configured to secure the cover to the component shelf when the components shelf deforms during the collision.

M: The assembly as recited in any of paragraphs G-L, wherein the component shelf further comprises one or more ribs that extend from a third side of component shelf to a fourth side of the component shelf, the one or more ribs configured to provide rigidity to the component shelf in order to support a weight associated with the component.

N: The assembly as recited in any of paragraphs G-M, wherein the component shelf comprises a polycarbonate material that is configured to bend when a force is applied to the second end.

O: The assembly as recited in any of paragraphs G-N, wherein the component shelf further comprises at least one inlet vent located proximate to the second side of the component shelf.

P: A component shelf comprising: a first connection point for attaching a first side of the component shelf to a seat bulkhead of a vehicle; a second connection point for attaching a second side of the component shelf to an end of a body of the vehicle, the second side being opposite to the first side; and a region having a mechanical property such that when an external force is applied in a longitudinal direction relative to the vehicle, the region deforms in order to minimize forces imparted to a seat of the vehicle.

Q: The component shelf as recited in paragraph P, further comprising: a third connection point for attaching a third side of the component shelf to a first bracket; and a fourth connection point for attaching a fourth side of the component shelf to a second bracket, the fourth side being opposite to the third side, wherein, during application of the force, the component shelf is releasable at the third connection point and the fourth connection point in order to allow the component shelf to deform in a region of the component shelf.

R: The component shelf as recited in either paragraph P or paragraph Q, further comprising: a first opening located proximate to a third side of the component shelf; and a second opening located proximate to a fourth side of the component shelf, the fourth side being opposite to the third side; and a third opening located between the first opening and the second opening.

S: The component shelf as recited in any of paragraphs P-R, further comprising: a first notch located at the first side of the component shelf; and a second notch located at the first side of the component shelf and spaced a distance from the first notch, wherein the region includes at least: a first portion of the component shelf that is located between the first opening and the first notch; a second portion of the component shelf that is located between the first notch and the third opening; a third portion of the component shelf that is located between the third opening and the second notch; and a fourth portion of the component shelf that is located between the second notch and the second opening.

T: The component shelf as recited in any of paragraphs P-S, further comprising: one or more first ribs that extend from a third side of component shelf to a fourth side of the component shelf, the one or more first ribs configured to provide rigidity to the component shelf in order to support a weight associated with the component; and one or more second ribs that extend from the first side of the component shelf to the second side of the component shelf, the one or more second ribs configured to help the component shelf deform during the application of the force.

What is claimed is:

1. A vehicle comprising:
an end of a body;
a seat bulkhead spaced inwardly from the body;
a component shelf located in an area between the end of the body and the seat bulkhead, the component shelf comprising:
a first connection point to the seat bulkhead at a first side of the component shelf;
a second connection point to the body at a second side of the component shelf, the second side being opposite to the first side; and
an opening;
a component disposed at least partially within the opening;
a weakened region;
a first notch located at the first side of the component shelf; and
a second notch located at the first side of component shelf,
wherein the weakened region comprises at least:
a first portion of the component shelf that is located between the first notch and the opening; and
a second portion of the component shelf that is located between the opening and the second notch,
wherein, upon a collision of the vehicle along a longitudinal direction, the weakened region deforms to minimize forces imparted to a seat of the vehicle.

2. The vehicle as recited in claim 1, wherein:
the opening comprises a first opening located proximate to a third side of the component shelf;
the component comprises a first speaker disposed at least partially within the first opening;
the component shelf further comprises:
a second opening located proximate to a fourth side of the component shelf, the fourth side being opposite to the third side; and
a third opening located between the first opening and the second opening; and
the vehicle further comprises:
a second speaker disposed at least partially within the second opening; and
a third speaker disposed at least partially within the third opening.

3. The vehicle as recited in claim 1, wherein the component shelf further comprises:
a first clip connection to a first bracket at a third side of the component shelf; and
a second clip connection to a second bracket at a fourth side of the component shelf, the fourth side being opposite to the third side,
wherein the first clip connection and the second clip connection are releasable during the collision in order to allow the weakened region to deform, and
wherein the deformation of the weakened region comprises one or more of a bending or a fracturing.

4. The vehicle as recited in claim 1, wherein the component shelf further comprises one or more ribs that extend from a third side of the component shelf to a fourth side of the component shelf, the one or more ribs configured to provide rigidity to the component shelf in order to support a weight associated with at least the component.

5. The vehicle as recited in claim 1, wherein the component shelf comprises a polycarbonate material that is configured to bend when a force is applied to the second end.

6. An assembly comprising:
a component shelf comprising:
a first connection point for attaching a first side of the component shelf to a seat bulkhead of a vehicle;
a second connection point for attaching a second side of the component shelf to an end of a body of the vehicle, the second side being opposite to the first side; and
an opening;
a component disposed at least partially within the opening,
a first notch located at the first side of the component shelf;
a second notch located at the first side of the component shelf and spaced a distance from the first notch; and
a region that is configured to bend during a collision, the region including at least:
a first portion of the component shelf that is located between the first notch and the opening; and
a second portion of the component shelf that is located between the opening and the second notch,
wherein at least region is configured to deform during the collision in order to minimize forces imparted to a seat of the vehicle.

7. The assembly as recited in claim 6, wherein the component shelf further comprises:
a third connection point for attaching a third side of the component shelf to a first bracket; and
a fourth connection point for attaching a fourth side of the component shelf to a second bracket, the fourth side being opposite to the third side,
wherein, during the collision, the component shelf is releasable at the third connection point and the fourth connection point in order to allow the component shelf to deform.

8. The assembly as recited in claim 6, wherein:
the opening is a first opening located proximate to a third side of the component shelf; and
the component shelf further comprises:
a second opening located proximate to a fourth side of the component shelf, the fourth side being opposite to the third side; and
a third opening located between the first opening and the second opening.

9. The assembly as recited in claim 8, wherein:
the component is a first speaker disposed at least partially within the first opening; and the assembly further comprises:
- a second speaker disposed at least partially within the second opening; and
- a third speaker disposed at least partially within the third opening.

10. The assembly as recited in claim 6, further comprising a cover disposed over at least a portion of the component shelf, wherein the cover comprises at least:
- a natural fiber board;
- a fabric disposed over the natural fiber board; and
- one or more connections that are configured to secure the cover to the component shelf when the components shelf deforms during the collision.

11. The assembly as recited in claim 6, wherein the component shelf further comprises one or more ribs that extend from a third side of component shelf to a fourth side of the component shelf, the one or more ribs configured to provide rigidity to the component shelf in order to support a weight associated with the component.

12. The assembly as recited in claim 6, wherein the component shelf comprises a polycarbonate material that is configured to bend when a force is applied to the second end.

13. The assembly as recited in claim 6, wherein the component shelf further comprises at least one inlet vent located proximate to the second side of the component shelf.

14. A component shelf comprising:
- a first connection point for attaching a first side of the component shelf to a seat bulkhead of a vehicle;
- a second connection point for attaching a second side of the component shelf to an end of a body of the vehicle, the second side being opposite to the first side;
- a region having a mechanical property such that when an external force is applied in a longitudinal direction relative to the vehicle, the region deforms in order to minimize forces imparted to a seat of the vehicle;
- a first opening located proximate to a third side of the component shelf;
- a second opening located proximate to a fourth side of the component shelf, the fourth side being opposite to the third side;
- a third opening located between the first opening and the second opening;
- a first notch located at the first side of the component shelf; and
- a second notch located at the first side of the component shelf and spaced a distance from the first notch,
wherein the region includes:
- a first portion of the component shelf that is located between the first opening and the first notch;
- a second portion of the component shelf that is located between the first notch and the third opening;
- a third portion of the component shelf that is located between the third opening and the second notch; and
- a fourth portion of the component shelf that is located between the second notch and the second opening.

15. The component shelf as recited in claim 14, further comprising:
- a third connection point for attaching a third side of the component shelf to a first bracket; and
- a fourth connection point for attaching a fourth side of the component shelf to a second bracket, the fourth side being opposite to the third side,
wherein, during application of the force, the component shelf is releasable at the third connection point and the fourth connection point in order to allow the component shelf to deform in a region of the component shelf.

16. The component shelf as recited in claim 14, further comprising:
- one or more first ribs that extend from a third side of component shelf to a fourth side of the component shelf, the one or more first ribs configured to provide rigidity to the component shelf in order to support a weight associated with the component; and
- one or more second ribs that extend from the first side of the component shelf to the second side of the component shelf, the one or more second ribs configured to help the component shelf deform during the application of the force.

17. The vehicle as recited in claim 1, wherein the component shelf further comprises an inlet vent located proximate to the second side of the component shelf.

18. The vehicle as recited in claim 1, further comprising:
- a cover disposed over at least a portion of the component shelf, wherein the cover comprises at least one of:
- a natural fiber board; or
- a fabric disposed over the natural fiber board; and
- one or more connections configured to secure the cover to the component shelf when the component shelf deforms during the collision.

19. The component shelf as recited in claim 14, further comprising, a polycarbonate material configured to bend when a force is applied to the component shelf.

20. The component shelf as recited in claim 14, further comprising an inlet vent located proximate to the second side.

* * * * *